United States Patent [19]
Iwatani

[11] Patent Number: 5,675,237
[45] Date of Patent: Oct. 7, 1997

[54] OUTPUT CONTROL DEVICE FOR VEHICLE AC GENERATOR

[75] Inventor: Shiro Iwatani, Tokyo, Japan

[73] Assignee: Mitsubishi Denki Kabushiki Kaisha, Tokyo, Japan

[21] Appl. No.: 547,806

[22] Filed: Oct. 25, 1995

[30] Foreign Application Priority Data

Nov. 15, 1994 [JP] Japan .................. 6-280584

[51] Int. Cl.[6] ........................................ H02J 7/14
[52] U.S. Cl. ................................ 322/28; 322/99
[58] Field of Search .................. 322/25, 26, 27, 322/28, 99

[56] References Cited

U.S. PATENT DOCUMENTS

| | | | |
|---|---|---|---|
| 4,636,706 | 1/1987 | Bowman et al. | 322/28 |
| 4,945,277 | 7/1990 | Iwatani et al. | 340/455 |
| 4,985,670 | 1/1991 | Kaneyuki et al. | 322/28 |
| 5,059,886 | 10/1991 | Nishimura et al. | 322/28 |
| 5,089,766 | 2/1992 | Iwatani | 322/25 |
| 5,376,876 | 12/1994 | Bauser et al. | 322/28 |
| 5,512,813 | 4/1996 | Uchinami | 322/28 |

FOREIGN PATENT DOCUMENTS 302735 12/1988 Japan.

*Primary Examiner*—Steven L. Stephan
*Assistant Examiner*—Nicholas Ponomarenko
*Attorney, Agent, or Firm*—Sughrue,Mion,Zinn,Macpeak & Seas, PLLC

[57] ABSTRACT

When the rectified output of an AC generator is changed over to a charging battery or a vehicle electric load, the value of exciting current to be supplied to the AC generator is controlled for the object for changing-over with a simple arrangement.

If the rectified output of the AC generator 1A is changed over to the battery 4 to be charged by the output change-over switch 71, a voltage regulator 3A regulates the exciting current flowing through the field coil 102 of the AC generator 1A by detecting the terminal voltage of the battery 4. If the rectified output of the AC generator 1A is changed over to the vehicle electric load 5, the voltage regulator 3A regulates the exciting current flowing through the field coil 102 of the AC generator 1A by detecting the voltage at the positive terminal 201 of the rectifier 2.

7 Claims, 3 Drawing Sheets

OUTPUT CONTROL DEVICE FOR VEHICLE AC GENERATOR

BACKGROUND OF THE INVENTION

1. Field of the Invention

The present invention relates to an output control device for vehicle AC generator for charge controlling a battery mounted on the vehicle, and, more particularly, to an output control device for vehicle AC generator for optimally operating a high voltage load which operates at a voltage higher than that of a battery.

2. Description of the Prior Art

When a catalyst heating system for purifying exhaust gas immediately after starting an engine or an ice melting system such as defroster for melting in a short period of time ice frozen on window-shilds of a vehicle in a severe cold area in winter is operated in a short period of time, it is necessary to apply a voltage of 30 V–50 V because such system is a high voltage load. However, it is impossible to supply such high voltage from a battery to the load constituting the system. Thus, the output of a vehicle AC generator is directly supplied to the system.

A conventional control device for vehicle AC generator is disclosed in U.S. Pat. No. 4,985,670. FIG. 3 is a circuit diagram showing the arrangement of the conventional device. An AC generator 1 driven by an engine (not shown) has an armature coil 101 and a field coil 102. A rectifier 2 full wave rectifies the AC output of the AC generator 1, and generates DC voltage across a positive terminal 201 and a grounded negative terminal 202.

A voltage regulator 3 regulates exciting current caused to flow through the field coil 102 upon changing over of the output of rectifier 2 to a battery 4 or to a high voltage vehicle electric load 5 (hereinafter called the "electric load"), and regulates the voltage generated by the AC generator 1 to a value corresponding to the object to which the rectifier is changed over.

When a key switch 6 is turned on, the engine is started, causes initial exciting current to flow from the battery 4 to the field coil 102 through an exciting line L3 taken out from an output change-over controller 7, and supplies a supply voltage to the voltage regulator 3 from the battery 4.

The voltage regulator 3 comprises a series circuit of divider resistors 301 and 302 for dividing a positive terminal voltage of the battery 4 input through a voltage detection line L1 which is taken out from the output change-over controller 7, or the output of rectifier, a Zenner diode 303 the cathode of which is connected to a connection point P between the divider resistors 301 and 302, and a base resistor 306 and a transistor 304 connected between the positive terminal of the battery 4 and the ground in series through the exciting line L3, the anode of the Zenner diode 303 being connected to the base of the transistor 304, the transistor 304 being turned on or off as the Zenner diode 303 is conductive or non-conductive.

In addition, a surge absorbing diode 307 and an output transistor 305 are connected in series between the positive terminal of the battery through the exciting line L3 and the ground, the base of the output transistor 305 being connected to the connection point between the base resistor 306 and the collector of the transistor 304 so that the transistor 305 is ON/OFF controlled by the transistor 304.

The field coil 102 is connected to the diode 307 in parallel through wiring. Therefore, the exciting current flowing from the battery 4 to the field coil 102 is repeatedly ON/OFF controlled by the output transistor 305.

Moreover, the output change-over controller 7 comprises an output change-over switch 71, an exciting switch 72, and a voltage detection change-over switch 73. The output change-over switch 71 has a common terminal C1 connected to the positive terminal 201 of the rectifier 2 through the output line L2, a contact A1 connected to the electric load 5, and a contact B1 connected to the positive terminal of the battery 4, and changes over the output with the exciting coil CL1 in such a manner that the common terminal C1 contacts the contact A1 or B1. The exciting switch 72 comprises a time limit contact T which is disconnected for about one second by excitation of the exciting coil CL2 when the output change-over switch 71 performs the change-over operation. One end of the exciting switch 72 is connected to the positive terminal of the battery 4 through a key switch 6, and the other end is connected to the positive side of the field coil 102 through the exciting line L3.

Furthermore, the common terminal C2 of the voltage detection change-over switch 73 is connected to one end of the divider resistor 301 through the voltage detection line L1, the contact A2 is connected to the common terminal C1 of the output change-over switch through a high voltage detection resistor 731, the contact B2 is connected to the positive terminal of the battery 4. Therefore, when the common terminal C2 of the output change-over switch 73 is connected to the contact A2, the high voltage detection resistor 731 is connected in series to the divider resistors 301 and 302 across which the output of rectifier is applied. When it is connected to the contact B2, the voltage at the positive terminal of the battery 4 is applied to a series circuit consisting of the divider resistors 301 and 302.

Now, the operation of the conventional device is described referring to FIG. 3. In the battery charging operation mode for charging the battery 4 (normal operation mode), the common terminal C1 of the output change-over switch 71 is connected to the contacts B1 and the common terminal C2 of the voltage charge-over switch 73 is connected to the B2, respectively, and the positive terminal of the battery 4 is connected to the positive terminal 201 of the rectifier 2 and the divider resistor 301.

Then, when the key switch 6 is turned on to start the engine of the vehicle, the exciting switch 72 is automatically turned on. As the result, the exciting current flows from the battery 4 to the field coil 102 of the AC generator 1 through the key switch 6 and the exciting switch 72.

When the engine is started, the field coil 102 is rotated with respect to the armature coil 101 to induce AC voltage in the armature coil 101. The induced AC voltage is rectified by the rectifier 2 and appears across the positive terminal 201 and the negative terminal 202 as DC voltage. The DC voltage is charged in the battery 4 through the output change-over switch 71.

As the engine is started, and the AC generator 1 continues generation, the battery 4 may be overcharged. Thus, the voltage at the positive terminal of the battery 4 is applied across the divider resistors 301 and 302 of the voltage regulator 3 through the voltage detection change-over switch 73. When the applied terminal voltage of the battery rises to, for example, 14 V or more, and the divider voltage appearing at the connection point P of the divider resistors 301 and 302 exceeds the conducting voltage of the Zenner diode 303, the Zenner diode 303 becomes conductive.

Thus, the transistor 304 becomes conductive to lower the base of the transistor 305 to the ground voltage, and to make the output transistor 305 nonconductive. Then, the exciting current supplied to the field coil 102 from the battery 4 through the output transistor 305 is interrupted. The interruption of the exciting current lowers the generated output of the AC generator 1, lowers the voltage of the positive terminal 201 of the rectifier 2, and thus controls the terminal voltage of the battery 4 to a setting value.

However, when the terminal voltage lowers as the voltage is supplied to the load from the battery 4, the divider voltage at the connection point P of the divider resistors 301 and 302 also lowers below the conducting voltage of the Zenner diode to make the Zenner diode 303 nonconductive and to also make the transistor 304 nonconductive. Then, the base current flows in the base of the output transistor 305 through the base resistor 306 to make it conductive so that the exciting current again flows in the field coil 102 from the battery 4 through the output transistor 305 to cause the AC generator 1 to generate power. The above operation is repeated every time the terminal voltage of the battery 4 lowers to control the terminal voltage of the battery 4 at a set value.

Next, the high voltage operation mode of the AC generator for operating the catalyst heating system or the defroster described. First, when the output of rectifier 2 is supplied to the electric load by changing over the output change-over switch 71 to the contact A1, the exciting switch 72 is turned off for about one second through energization of the exciting coil CL2 so that the exciting current flowing through the field coil 102 attenuates. Thus, the output change-over switch 71 is not damaged by spark or the like generated at the contact at changing over.

While the exciting switch 72 is turned off, the output change-over switch 71 is changed over to the contact A1 so that the positive terminal 201 of the rectifier 2 is connected to the electric load 5. Moreover, the voltage detection change-over switch 73 is connected to the contact A2 so that the high voltage detection resistor 731 is connected to the divider resistor 301. As the result, the high voltage detection resistor 731, and the divider resistors 301 and 302 are connected in series between the positive terminal 201 of the rectifier 2 and the ground.

After the connection of the switches 71 and 73 completes, the exciting switch 72 returns to the closed state. Sequence control of these change-over switches 71 and 73 are automatically performed by a control circuit (not shown) incorporated in the output change-over controller 7. When the exciting switch 72 is closed, the exciting current flows from the battery 4 to the field coil 102, the generated voltage increases along the rotation of engine to raise the DC current at the positive terminal 201 of the rectifier 2 so that it is supplied to the electric load 5 through the output change-over switch 71.

The output voltage of the rectifier 2 is detected by the high voltage detection resistor 731, and the divider resistors 301 and 302. At the moment, if the output voltage value of the rectifier 2 rises, for example, above 50 V, the divider voltage at the connection point P of the divider resistors 301 and 302 becomes the Zenner diode conducting voltage to conduct the Zenner diode 303.

As the result, the transistor 304 conducts to lower the base of the transistor 305 to the ground voltage so that the output transistor 305 is made nonconductive. Thus, the exciting current supplied from the battery 4 to the field coil 102 through the output transistor 305 is interrupted. As the exciting current is interrupted, the voltage at the positive terminal 201 of the rectifier 2 does not rise to more than 50 V, but is at a constant voltage.

However, when the voltage at the positive terminal 201 of the rectifier 2 is below a constant value by supplying a voltage to the electric load 5, the divider voltage at the connection point of the divider resistors 301 and 302 also lowers so that the Zenner diode 303 becomes nonconductive, and the transistor 304 also becomes nonconductive. Then, base current flows through the base of the output transistor 305 through the base resistor 306 to make it conductive. The exciting current again flows from the battery 4 to the field coil 102 through the output transistor 305 to start power generation.

The high voltage to be supplied to the electric load 5 is controlled to a constant value by repeating the above operation every time the voltage at the positive terminal 201 of the rectifier 2 lowers. In such high voltage operation mode, the battery 4 is not charged by the generated power of the generator 1, but only supplies the exciting current to the field coil 102, and becomes the discharge state.

Thus, the high voltage operation of the generator 1 is limited to a short period of time (about several minutes) to prevent over discharge of the battery 4. In addition, it is arranged, when the terminal voltage of the battery 4 lowers below a predetermined value, the high voltage operation is stopped, and the operation returns to the normal battery charging operation. Such operation is performed by a control circuit (not shown) incorporated in the output change-over controller 7.

When a conventional output control device for a vehicle AC generator is arranged as described above, it has the following problems.

1) It is necessary to provide a voltage detection change-over switch to detect the terminal voltage of the battery in the normal battery charging operation and the rectified output in the high voltage operation. This increases the number of components constituting the device, leading to cost increase.

2) Furthermore, when a mechanical switch using metal contact is used for the voltage detection change-over switch in view of the current capacity, it is unavoidable that the contact resistance increases due to aging of the contacts so that voltage drop occurs across the contacts. If the voltage drop becomes large, it is necessary to apply the rectified output or the terminal voltage of the battery higher than normal value across the divider resistors so as to obtain conduction voltage for the Zenner diode. Consequently, the regulated voltage in the normal operation mode and the high voltage operation mode must be raised so that the life of the electric load and the battery deteriorates.

3) Furthermore, since the voltage drop becomes infinite as the voltage detection change-over switch is broken and the contact resistance becomes infinite, the rectified output and the terminal voltage of the battery are not fed back to the voltage regulator so that the output voltage of the AC generator is impossible to be controlled. Thus, the output voltage of the rectifier abnormally increases to overcharge the battery so that unrecoverable damage occurs or the electric load is broken.

SUMMARY OF THE INVENTION

The present invention is made to solve the above-mentioned problems, and is intended to obtain a reliable control device for an AC generator for vehicle which can be constructed at low cost by eliminating a voltage detection change-over switch in an output change-over unit, and which eliminates variation of the regulated voltage due to deterioration of contacts which may otherwise damage the battery and the electric load.

According to one aspect of the invention, an output control device for a vehicle AC generator comprises a rectifier for rectifying output of the AC generator having a field coil, output change-over means for selectively connecting the output of the rectifier to a battery or a vehicle electric load, and generator output control means for controlling the output of the rectifier to respective predetermined values according to detection or non-detection of the terminal voltage of the battery when the output of the rectifier is changed over to the battery, or according to change-over of the output of the rectifier to the electric load. Accordingly, it is possible to prevent overcharging of the battery and over output to the vehicle electric load with a simple arrangement.

In a preferred embodiment, generator output control means comprises first voltage detection means for detecting the voltage of the battery from a battery voltage detection terminal and controlling the rectified output of the AC generator to a first predetermined value, applied voltage detection means for detecting application of voltage to the battery voltage detection terminal, and second voltage detection means for controlling the rectified output of the AC generator to a second predetermined value slightly higher than the first predetermined value when no voltage is detected by the applied voltage detection means, and controlling the rectified output of the AC generator to a third predetermined value of voltage slightly higher than the second predetermined value when the output of the battery becomes lower than a predetermined value and when a voltage is detected by the applied voltage detection means. Accordingly, the reliability can be improved because, even if the voltage of the battery cannot be detected, the rectified output can be regulated to a constant value, and overcharging of the battery can be prevented.

In another preferred form, an output control device for a vehicle AC generator further comprising power supply control means connected between the battery and the generator output control means for instantaneously interrupting the power supply of the generator output control means to interrupt excitation of the field coil interrupt in response to change-over of the output change-over means during self-excitation of the AC generator. Accordingly, the safety of the device can be secured by suppressing surge when the output is changed over.

In a further preferred embodiment, the output change-over means comprises initial excitation means connected beteween the field coil and the battery for causing initial exciting current to flow from the battery to the field coil when the output of rectifier is changed over to the vehicle electric load by the output change-over means during self-excitation of the AC generator. Accordingly, the initial exciting current can be caused to flow at appropriate timing.

The exciting current to the field coil is supplied from the battery to operate the AC generator for excitation. Accordingly, the effect of surge when the output of rectifier is changed over can be reduced, and the circuit configuration can be simplified because the circuit for preventing surge becomes unnecessary.

The output control device for a vehicle AC generator further comprises defect detection means for interrupting the exciting current by detecting defective generation of the AC generator. Accordingly, safety is further improved.

DESCRIPTION OF THE PREFERRED EMBODIMENTS

Embodiment 1

Figure 1:
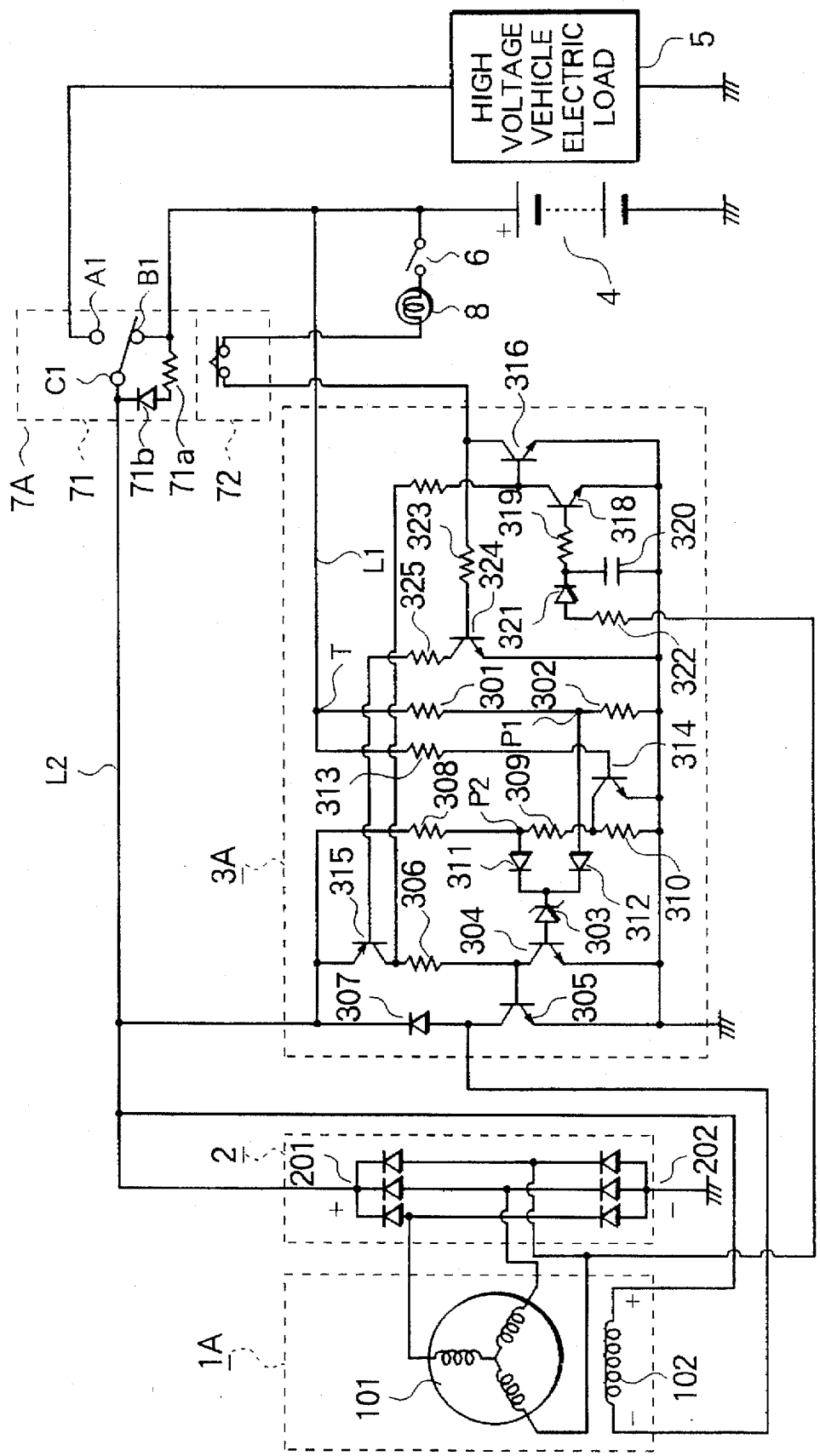
FIG. 1 is a circuit diagram showing the configuration of an output control device for a vehicle AC generator according to Embodiment 1 of the present invention.
Figure 3:
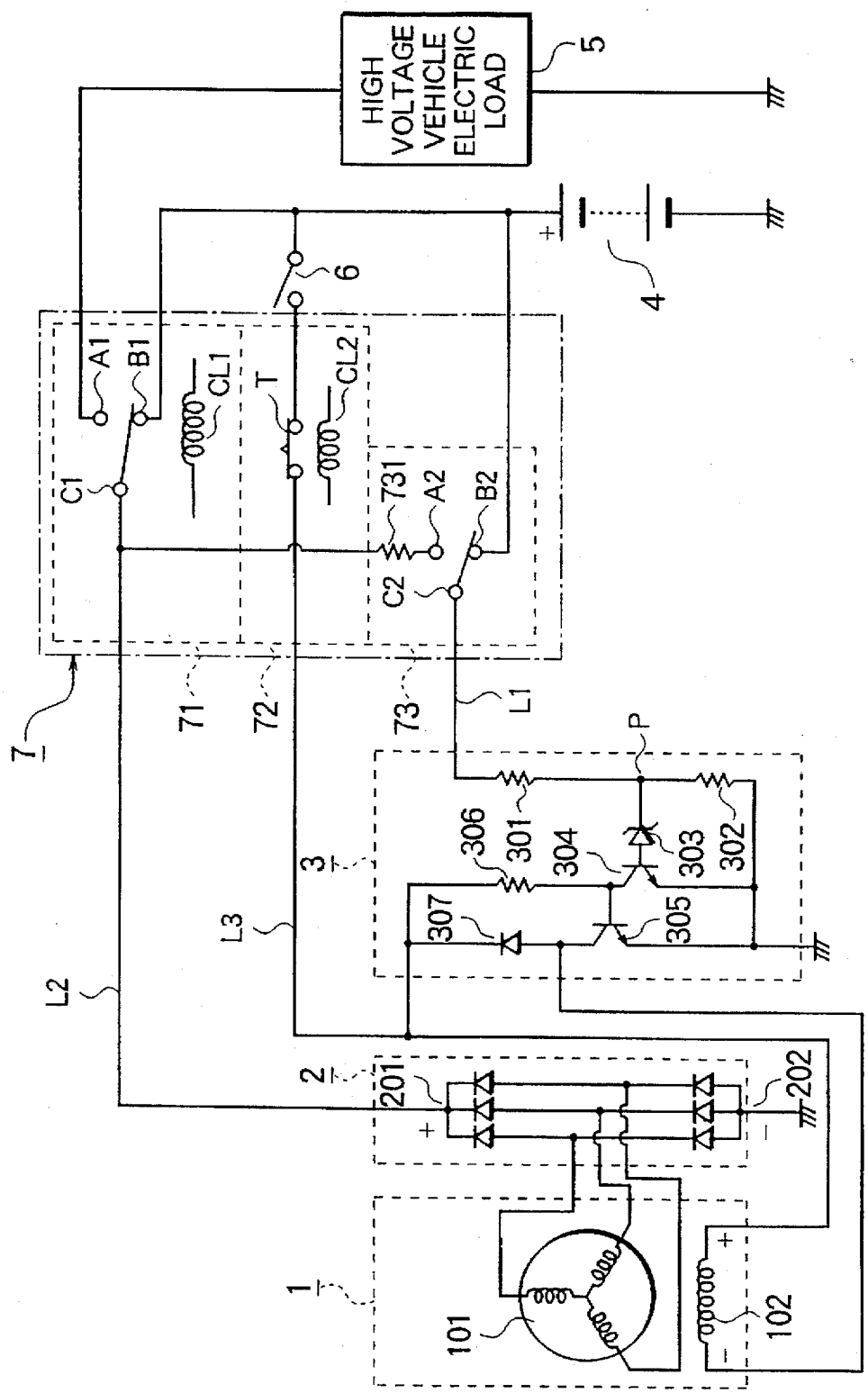
FIG. 3 is a circuit diagram showing the configuration of a conventional output control device for a vehicle AC generator.

An embodiment of the present invention will now be explained with reference to the drawings. FIG. 1 is a circuit diagram showing the configuration of a control device for a vehicle AC ,generator according to this embodiment. In the figure, similar references to elements shown in FIG. 3 denote corresponding components. The AC generator 1A of this embodiment is of a self-excitation type. After the AC generator 1A starts generation, the exciting current for the field coil 102 is supplied from the positive terminal of the rectifier 2. The power source of a voltage regulator 3A which intermittently controls the exciting current to be supplied to the field coil 102 is interrupted for a moment in synchronization with changing-over of the output change-over switch 71 so that superposition surge on the supply voltage is suppressed. The voltage regulator according to this embodiment (generator output control means) 3A comprises first voltage detection means, second voltage detection means, power supply control means, defect detection means, and applied voltage detection means. Then, the first voltage detection means comprises divider resistors 301 and 302 which are connected in series between a battery voltage detection terminal T connected to the positive terminal of the battery 4 by a voltage detection line L1, and the ground. Divider voltage is detected at a connection point P1 between the divider resistors 301 and 302.

The second voltage detection means comprises divider resistors 308, 309, and 310 which are connected in series an output line L2 connected to the positive terminal 201 of the rectifier 2 and the ground. Divider voltage is detected at connection points P2 between the divider resistors 308 and 309. The connection points P1 and P2 are connected with the anodes of diodes 311 and 312, respectively, to commonly connect the cathodes of the diodes 311 and 312 to the cathode of a Zenner diode 303.

The anode of the Zenner diode 303 is connected to the base of a transistor 304 the emitter of which is connected to the ground, and the collector of which is connected to the base of a transistor 305. In addition, a base resistor 306, and the collector and emitter of a transistor 315 are connected in series between the collector of the transistor 304 and the output line L2.

The power supply control means comprises transistors 315 and 324, and resistors 323 and 325. The resistor 325, and the collector and emitter of the transistor 324 are connected in series between the base of the transistor 315 and the ground. The base of the transistor 315 is connected to the positive terminal of the battery 4 through a resistor 323, an exciting switch 72, a charge indicator 8, and a key switch 6.

The defect detection means, or fault detection means, for shutting down the exciting current by detecting defective generation consists of transistors 316 and 318, resistors 319 and 322, and a diodes 321, and a capacitor 320. The collector and emitter of the transistor 316 is connected between the base resistor 323 at the end connecting the exciting switch 72 and the ground, and its base is connected to the collector of the transistor 315 through the base resistor 317. The collector and emitter of the transistor 318 are connected between the base of the transistor 316 and the ground. The resistor 319, the diode 321, and the resistor 322 are connected in this order from the base between its base and one arm of the rectifier 2. The capacitor 320 is connected between the connection point of the resistor 319 and the diode 321, and the ground.

The applied voltage detection means consists of the transistor 314 the collector and emitter of which are connected across the divider resistor 310, and the base of which is connected to the battery voltage detection terminal T through resistor 313. In addition, an output change-over controller 7A of this embodiment consists of the output change-over switch 71 and the exciting switch 72.

A common terminal C1 of the output change-over switch 71 is connected to the positive terminal 201 of the rectifier 2 through the output line L2, a contact A1 is connected to the electric load 5, and the contact B1 is connected to the positive terminal of the battery 4. Furthermore, the common terminal C1 is connected to the cathode of a diode 71b, and a resistor 71a is connected between the anode of the diode 71b and the contact B1. Then, the initial exciting means consists of the diode 71b and the resistor 71a.

One end of the exciting switch 72 is connected to the base of the transistor 324 through the base resistor 323, and the other end of the exciting switch 72 is connected to the positive terminal of the battery 4 through the charge indicator 8 and the key switch 6.

Now, the operation of this embodiment is explained. First, in the normal battery charging operation mode, the key switch 6 is turned on in a state where the common terminal C1 of the output change-over switch 71 is connected to the contact B1, and the exciting switch 72 is turned on. The transistor 324 conducts as the base current is inputted from the battery 4 through the base resistor 323, and, as the transistor conducts, the transistor 315 conducts.

Consequently, a positive voltage is applied to the base of the output transistor 305 from the collector of the transistor 315 through the resistor 306, and a positive voltage is applied to the base of the transistor 316 through the resistor 317 so that both transistors 305 and 316 conduct. When the transistor 305 conducts, a closed loop comprising the battery 4, the output change-over switch 71, the field coil 102, the transistor 305 and the ground is formed so that the exciting current flows in the field coil 102. At the moment, conduction of the transistor 316 lights the charge indicator 8, which lights for a moment and goes out as the generation is started.

When the AC generator 1A operates while the exciting current is flowing, a charging voltage is applied to the positive terminal of the battery 4 from the positive terminal 201 of the rectifier 2 through the output change-over switch 71 so that the voltage increases at the battery voltage detection terminal T. The transistor 314 conducts when the battery voltage detection terminal T exceeds 14 V to short circuit the divider resistor 310 so that the second voltage detection means operates with the divider resistors 308 and 309.

When the battery voltage applied to the first voltage detection means comprising the divider resistors 301 and 302 exceeds 14 V (first predetermined value), the Zenner diode 303 conducts by the divider voltage at the connection point P1. In addition, when the second voltage detection means is formed by the divider resistors 308, 309, and 310, if the output voltage of the rectifier 2 to be applied exceeds 15 V (third predetermined value), the Zenner diode 303 conducts by the divider voltage at the connection point P2.

Therefore, when the battery voltage exceeds 14 V, the transistor 304 conducts to make the output transistor 305 nonconductive so that the supply of the exciting current to the field coil 102 is stopped. Consequently, the battery voltage does not exceed 14 V, but becomes constant. However, if a voltage is supplied from the battery 14 to ordinary electric loads (not shown) not requiring a high voltage under this state, the battery voltage lowers below 14 V. As the result, the Zenner diode 303 becomes nonconductive to make the transistor 304 nonconductive. Then, the output transistor 305 conducts, and again supplies the exciting current to the field coil 102 to start the generation by the generator 1 so that charging of the battery 4 is started.

In the battery charging operation mode, if the voltage detection line L1 connecting the positive terminal of the battery 4 to the battery voltage detection terminal T of the voltage regulator 3A is blocked by the vibration of the engine or the like, an over charge state occurs because the battery voltage is not fed back to the voltage regulator 3A. Thus, if the voltage detection line L1 is broken, the transistor 314 becomes nonconductive so that the second voltage detection means is formed by the divider resistors 308, 309, and 310. When the output of rectifier applied to the second voltage detection means exceeds 15 V, the Zenner diode 303 conducts by the divider voltage at the connection point P2 to make the transistor 304 conductive.

Consequently, the output transistor 305 becomes nonconductive to stop supply of the exciting current to the field coil 102. Then, the output of rectifier starts to lower below 15 V so that the charging of the battery 4 is stopped and the over-charge is prevented. In addition, when the output of rectifier becomes below the predetermined value to make the transistor 304 non-conductive, the output transistor 305 conducts and again supplies the exciting current to the field coil 102 so as to start generation and to resume charging.

Then, when the operation mode is changed to the high voltage load operation mode, the output change-over switch 71 is changed over to the contact 1A. This changing-over should be performed during the generation operation where the exciting current flows in the field coil 102. Consequently, surge may occur at the changing-over of the switch by the inductance component of the field coil 102, and appear on the supply voltage of the voltage regulator 3A so that all the transistors are destroyed.

Therefore, when the contact of the output change-over switch 71 is changed over from A1 to B1, or oppositely, the transistors 324, 315 and 305 are made nonconductive by turning off the exciting switch 72 for about one second to stop excitation of the field coil 102. The control for turning off the exciting switch 72 for about one second when changing over the output change-over switch 71 is performed by the control circuit (not shown) contained in the output change-over control circuit 74.

When the exciting switch 72 again turns on after the elapse about one second, the transistors 324, 315, and 305 becames conducting. At the moment, the initial exciting current flows in the field coil 102 through the battery 4 the resistor 71a, the diode 71b, the field coil 102, the transistor 305, and the ground forming the closed loop. Then, after starting of generation, the AC generator 1A is in the self-excitation operation by causing the output of rectifier to flow through the field coil 102.

At the moment, because the battery 4 is not charged by the output of rectifier and naturally discharges, the Zenner diode conducting voltage is not taken out from the connection point P1 in the first voltage detection means so that the transistor 304 and the output transistor 305 do not operate. Then, the second voltage detection means to be applied with the output of rectifier is operated. In this case, the transistor 314 detects voltage from the battery voltage detection terminal T and conducts so that the divider resistor 310 is short circuited. Therefore, the second voltage detection means is formed by the divider resistors 308 and 309.

In this state, the output from the AC generator 1A is supplied to the electric load 5 from the positive terminal 201 of the rectifier 2 through the output change-over switch 71. The output of rectifier is applied across the divider resistors 308 and 309 which form the second voltage detection means. When the applied voltage exceeds the 50 V (second predetermined voltage), the Zenner diode 303 conducts by the divider voltage at the connection point P2 to make the transistor 304 conductive.

Consequently, the output transistor 305 becomes nonconductive and stops supply of the exciting current to the field coil 102. In addition, the output of rectifier does not exceed 50 V so that it does not apply excess current to the electric load 5. Moreover, when the output of rectifier becomes below the predetermined value, the Zenner diode 303 and the transistor 304 become nonconductive, and the output transistor 305 conducts so that the exciting current is again supplied to the field coil 102 to start generation. Therefore, it becomes possible to regulate the voltage to be supplied to the electric load 5 to the constant value by intermittently controlling the exciting current.

In the series circuit of the diode 71b and the resistor 71a for supplying the initial exciting current from the battery 4 to the field coil 102, because the diode 71b is connected in the direction opposite to the flowing direction of the output of rectifier, the battery 4 is not over-charged even if the output change-over switch 71 is connected to the electric load 5 and the output of rectifier is applied to the electric load 5.

In addition, although the charge indicator 8 turns off during generation when the transistor 316 becomes nonconductive as the transistor 318 conducts, if the voltage of the armature 101 abnormally lowers for one phase, the transistor 318 becomes nonconductive. Moreover, as the transistor 318 becomes nonconductive, a voltage is applied to the base of the transistor 316 through the resistor 317 to make that transistor conductive so that the charge indicator 8 turns on to indicate an abnormal condition of the AC generator 1A. At the moment, because the voltage on the base resistor 323 becomes the ground level as the transistor 316 conducts, the transistors 324, 315, and 305 become nonconductive to interrupt the exciting current flowing through the field coil 102.

Embodiment 2

Figure 2:
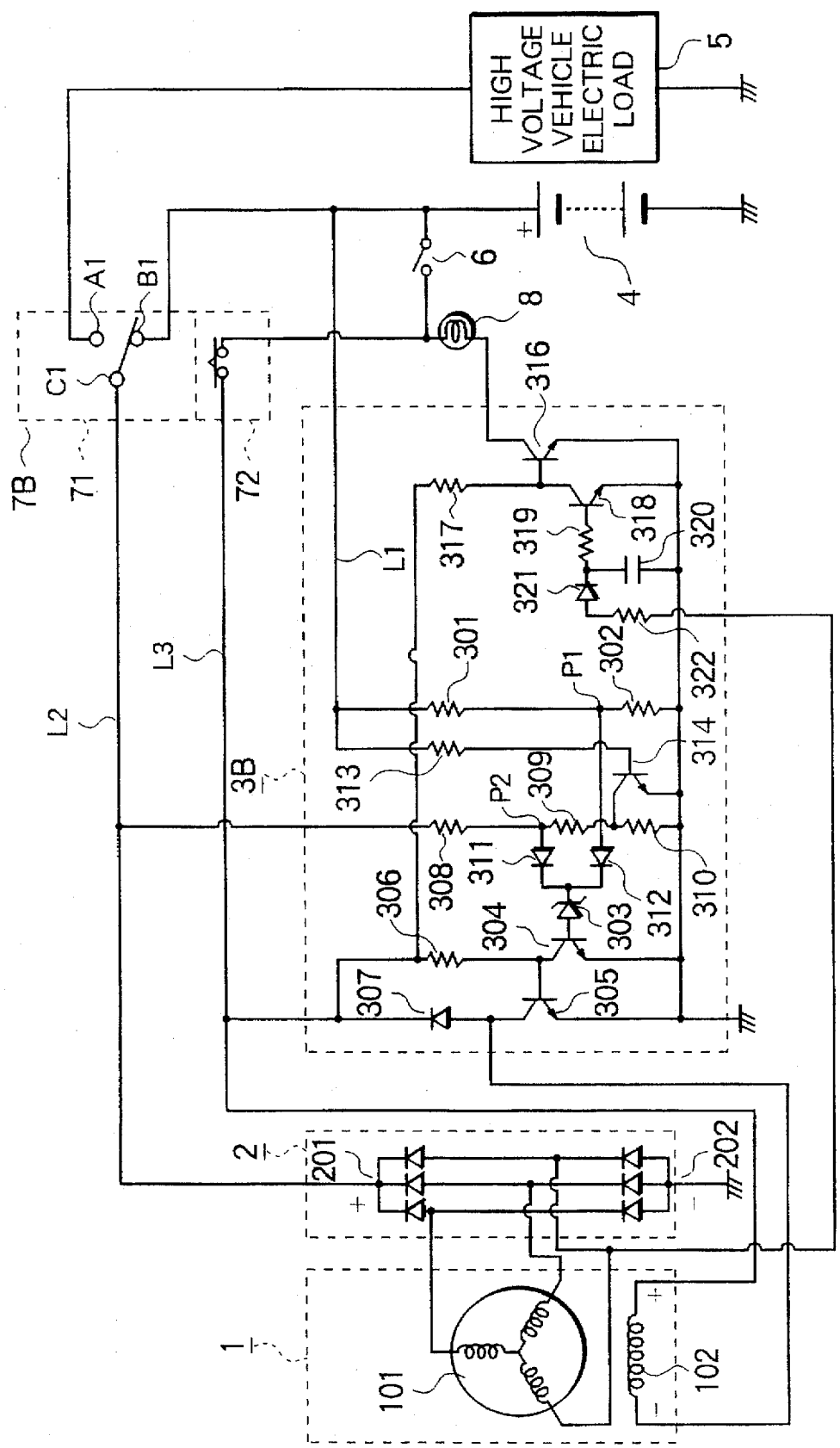
FIG. 2 is a circuit diagram showing the configuration of an output control device for a vehicle AC generator according to Embodiment 2 of the present invention.

While the above embodiment has been described for the control of output of the self-excitation type AC generator, the output control device of the present invention can be also applied to a separate excitation type AC generator. FIG. 2 shows the arrangement of the control device for vehicle AC generator according to this embodiment. Because this embodiment supplies the exciting current from the battery 4 to the field coil 102, when compared with Embodiment 1, this embodiment does not require the initial excitation circuit which consists of the resistor 71a and the diode 71b both connected in series between the common terminal C1 and the contact B1 of the output change-over switch 71, and the exciting current interruption circuit which consists of the transistors 315 and 324, and the resistors 323 and 325. Other arrangement of this embodiment is substantially same as those of Embodiment 1.

Then, the circuit configuration which particularly differs from Embodiment 1 lies in that one end of the field coil 102 is connected to the collector of the output transistor 305, and the other end is connected to the exciting switch 72 through the exciting line L3. In addition, the charge indicator 8 is connected between the collector of the transistor 316 for driving the indicator, and the connection point between the exciting switch 72 and the key switch 6.

Now, the operation of this embodiment is described by noting differences from Embodiment 1. First, in the normal battery charging operation mode, when the common terminal C1 of the output change-over switch 71 is connected to the contact B1, and the key switch 6 is turned on, the battery voltage is applied to the base of the output transistor 305 through the key switch 6, the exciting switch 72, and the resistor 306 to make the output transistor 305 conductive so that the exciting current flows through the field coil 102. In this state, when the generator 1 starts generation as the engine is started, the battery 4 is continued to be charged. When the terminal voltage exceeds 14 V, the first voltage detection means operates to interrupt the exciting current so that the generation is stopped. In addition, when the terminal voltage becomes below 14 V, the generation is resumed.

Furthermore, because when the battery charging operation mode is changed over to the high voltage load operation, a spark may be generated as the output change-over switch 71 changes over from the contact B1 to the contact A1 so that the contacts are damaged, the exciting switch 72 is turned off for about one second to attenuate the exciting current.

At the moment when the exciting current attenuates, the exciting switch 72 is again turned on so that the exciting current flows from the battery 4 to the field coil 102 to start generation. Consequently, power is supplied to the electric load 5 from the positive terminal 201 of the rectifier 2 through the output change-over switch 71. When the voltage generated by the AC generator 1 increases so that the voltage at the positive terminal of the rectifier 2 increases, the second voltage detection means operates to make the output transistor 305 nonconductive so that the exciting current is stopped. Thus, the voltage to be supplied to the electric load is regulated to the predetermined value. Other operations are same as those of Embodiment 1.

What is claimed is:

1. An output control device for a vehicle AC generator, comprising:
   a rectifier for rectifying an output of said AC generator;
   a field coil for said generator;
   output change-over switching means for selectively connecting the output of said rectifier to a battery or a high voltage vehicle electric load, and
   generator output control means for controlling the output of said rectifier to different predetermined values based on detection of the terminal voltage of said battery in a first mode, when the output of said rectifier is connected to said battery, or based on the output of said rectifier in a second mode, in which the rectifier output is connected to said electric load, or based on the output of said rectifier in a third mode when the rectifier is connected to said battery and output of said battery drops below a predetermined level.

2. An output control device for a vehicle AC generator as set forth in claim 1, wherein said generator output control means comprises:

first voltage detection means for detecting the voltage of said battery from a battery voltage detection terminal and controlling the rectified output of said AC generator to a first predetermined value;

applied voltage detection means for detecting application of voltage to said battery voltage detection terminal, and second voltage detection means for controlling the rectified output of said AC generator to a second predetermined value when the rectified output of said AC generator is connected to said electric load, and for controlling the rectified output of said AC generator to a third predetermined value when the rectified output of said AC generator is connected to said battery but said applied voltage detection means does not detect a voltage above said predetermined level.

3. An output control device for a vehicle AC generator as set forth in claim 1 further comprising power supply control means connected between said battery and said generator output control switching means for instantaneously interrupting the power supply of the generator output control means to interrupt excitation of said field coil in response to change-over of the output change-over means during self-excitation of said AC generator.

4. An output control device for a vehicle AC generator as set forth in claim 3, wherein the output change-over switching means comprises an initial excitation means connected between said field coil and said battery for causing initial exciting current to flow from said battery to said field coil when the output of rectifier is changed over to the vehicle electric load by said output change-over switching means during self-excitation of the AC generator.

5. An output control device for a vehicle AC generator as set forth in claim 1, wherein the exciting current to said field coil is supplied from said battery to operate said AC generator for excitation.

6. An output control device for a vehicle AC generator as set forth in claim 1 further comprising fault detection means for interrupting the exciting current by detecting defective generation of said AC generator.

7. An output control device for a vehicle AC generator as set forth in claim 5 further comprising fault detection means for interrupting the exciting current by detecting defective generation of said AC generator.

* * * * *